(12) United States Patent
Belmonte et al.

(10) Patent No.: US 8,215,910 B2
(45) Date of Patent: Jul. 10, 2012

(54) AIRCRAFT TURBOMACHINE FAN COMPRISING A BALANCING FLANGE CONCEALED BY THE INLET CONE

(75) Inventors: Olivier Belmonte, Savigny le Temple (FR); Jean-Luc Christian Yvon Goga, Champagne sur Seine (FR)

(73) Assignee: SNECMA, Paris (FR)

( * ) Notice: Subject to any disclaimer, the term of this patent is extended or adjusted under 35 U.S.C. 154(b) by 1246 days.

(21) Appl. No.: 12/193,886

(22) Filed: Aug. 19, 2008

(65) Prior Publication Data

US 2009/0087313 A1    Apr. 2, 2009

(30) Foreign Application Priority Data

Aug. 24, 2007    (FR) ...................................... 07 57167

(51) Int. Cl.
    *F01D 5/10*    (2006.01)
(52) U.S. Cl. ....................................................... 416/144
(58) Field of Classification Search .................. 416/144, 416/145, 61, 500, 244 A, 244 B, 245 A, 245 R; 415/118, 119, 218.1, 219.1
    See application file for complete search history.

(56) References Cited

U.S. PATENT DOCUMENTS

2005/0231052 A1    10/2005    Rockarts et al.
2009/0087313 A1*   4/2009     Belmonte et al. ............. 416/144

FOREIGN PATENT DOCUMENTS

WO    WO 02/20349 A1    3/2002

OTHER PUBLICATIONS

U.S. Appl. No. 13/131,500, filed May 26, 2011, Belmonte, et al.

\* cited by examiner

*Primary Examiner* — Jack Chen
(74) *Attorney, Agent, or Firm* — Oblon, Spivak, McClelland, Maier & Neustadt, L.L.P.

(57) ABSTRACT

An aircraft turbomachine fan is disclosed. The fan includes a turbomachine inlet cone that has an exterior surface intended to be closely followed by a flow section of the turbomachine, and an annular balancing flange that rotates as one with a fan disk about an axis of rotation and is equipped with a plurality of weight-fixing holes. The fan also includes one or more balancing weights mounted fixedly on the annular balancing flange. The annular balancing flange is positioned inside the inlet cone in such a way that its weight-fixing holes are isolated from the flow section. The flange is produced as a single piece with a fan blade retaining ring.

8 Claims, 5 Drawing Sheets

AIRCRAFT TURBOMACHINE FAN COMPRISING A BALANCING FLANGE CONCEALED BY THE INLET CONE

BACKGROUND OF THE INVENTION

The present invention relates in general to a turbomachine fan. More specifically, it relates to the balancing system with which the fan is equipped allowing ultimate balancing of the turbomachine.

The invention preferably applies to an aircraft turbojet engine.

DESCRIPTION OF THE PRIOR ART

The prior art effectively teaches equipping the fan of a turbojet engine with an annular balancing flange bearing carefully positioned weights in order ultimately to balance the turbojet engine.

FIGS. 1 and 2 depict a conventional embodiment known from the prior art.

These figures show a fan 1 with a longitudinal axis or axis of rotation 2 that also corresponds to the longitudinal axis of the associated turbojet engine. This fan comprises a fan disk 4 centered on the axis 2, fan blades 6 attached to the disk 4 and spaced apart in the circumferential or tangential direction, which is symbolized by the double-headed arrow 8.

Thus, the blades 6 are rotationally driven with the disk 4, about the axis of rotation 2. It also comprises, in the known way, platform-forming sectors (not depicted) attached fixedly to the disk 4 between two blades 6 that follow on directly from one another in the circumferential direction 8, these sectors partially defining an inter-blades surface that an annular air flow, also known as the flow section of the turbojet engine, that flows through the fan, is intended to follow closely. The direction of this flow or of this flow section 22 which, overall, corresponds to the main direction in which gases flow through the turbojet engine, is depicted by the arrow 14 and can also be likened to an axial direction of the fan 1.

Furthermore, the fan 1 is also equipped with an annular blade retaining device 16 retaining the blades 6 in the axial direction 14, on the upstream side. In this respect it must be noted that throughout the description, the terms "upstream" and "downstream" are to be considered in relation to the main direction 14 in which the gases flow through the turbojet engine.

Upstream of the fan blades 6, the fan 1 has an inlet cone 20 centered on the axis 2 and the substantially conical exterior surface 19 of which is intended to be followed closely by the aforementioned flow section 22. This cone 20, rotated about the axis 2 with the fan disk 4, can be made of one or several adjacent parts, for example an upstream part 20a starting from the vertex of the cone, and a downstream part 20b adjacent to the fan blades, as may be seen in FIGS. 1 and 2.

The downstream part 20b, also known as the cowl rear shell ring, can, aside from its function of defining part of the exterior surface 19 that bounds the flow section 22, also incorporate an additional function acting as a system for balancing the turbojet engine.

Specifically, this downstream part 20b forms an annular balancing flange that rotates as one with the fan disk 4 about the axis of rotation 2 and which is equipped with a plurality of weight-fixing holes 24 circumferentially spaced apart. By way of nonlimiting example, there are, for example, thirty-six through-holes 24 provided in the balancing flange 20b. As can be seen in FIGS. 1 and 2, in embodiments of the prior art, the weight-fixing holes 24 therefore open into the flow section 22 at their radially outer end.

During operation, the holes 24 each house a balancing weight 26 in the form of a screw, the dimensions of which are specified in such a way that the associated weights permit optimal balancing of the turbojet engine, to compensate for any residual imbalance. Thus, as is known to those skilled in the art, it is the length of the shank of the screws that is tailored to suit the desired mass, these screws being housed in their associated holes with the screw head directed radially outward.

Nonetheless, while this configuration does allow optimal balancing of the turbojet engine, it is not without its disadvantages. Firstly, it is found that the through-nature of the holes 24, which means that they open into the flow section 22, means that each of these holes has to be closed off using a balancing screw 26, so as to prevent any leaks of flow section toward the inside of the inlet cone 20. As a result, the substantial number of balancing screws 26 that this requirement entails, for example 36 screws, becomes extremely penalizing in terms of weight.

In addition, even when the screws 26 are in place, the exterior surface 19 bounding the flow section 22 does not have a perfect aerodynamic profile given that hollows 28 remain at the outer radial end of the weight-fixing holes, as can be clearly seen in FIGS. 1 and 2. These hollows 28, the bottoms of which consist of associated screw heads, stem essentially from the fact that the screws are arranged in the radial direction, combined with the substantially conical nature of the surface 19. With this aerodynamic profile penalized by the hollows 28, the air flow over the inlet cone is clearly not optimized. This results in drag and, as a result, in turbomachine performance losses.

In order to tackle this disadvantage proposals have been made, as is clearly evident for example from document U.S. 2005/0231052, that the annular balancing flange be positioned on the inside of the inlet cone so that its weight-fixing holes are isolated from the flow section of the turbomachine.

However, that configuration does not prove to be entirely optimized, particularly on account of the fact that this region is very cluttered.

SUMMARY OF THE INVENTION

It is therefore an object of the invention to remedy, at least in part, the abovementioned disadvantages relating to embodiments of the prior art.

To do this, a first subject of the invention is an aircraft turbomachine fan comprising a turbomachine inlet cone that has an exterior surface intended to be closely followed by a flow section of the turbomachine, a fan disk and fan blades which are mounted on said disk with which they rotate about an axis of rotation of the fan, said fan comprising an annular balancing flange that rotates as one with the fan disk about said axis of rotation and is equipped with a plurality of weight-fixing holes spaced circumferentially apart, said fan also comprising one or more balancing weights mounted fixedly on said annular balancing flange by means of one or several of said weight-fixing holes. In addition, said annular balancing flange is positioned inside said inlet cone in such a way that its weight-fixing holes are isolated from said flow section of the turbomachine. According to the invention, the fan further comprises a fan blade retaining ring for axially retaining these blades with respect to said fan disk, said retaining ring and said annular balancing flange being produced as a single piece.

Thus, the proposed invention advantageously makes it possible to reduce the overall size and weight because the same fasteners can be used to install the retaining ring and the annular balancing flange which are produced as a single piece.

In addition, in this case, the ring may possibly be designed to form a downstream part of said inlet cone. An alternative might of course be to contrive for the single piece that forms the ring and the flange to be situated entirely on the inside of the cone, and therefore hidden from the flow section of the turbomachine by this cone.

Furthermore, in the fan according to the invention, the balance weight-fixing holes no longer open into the turbomachine flow section because the annular balancing flange bearing these holes is surrounded by the inlet cone that defines the flow section. In other words, the cone lies radially on the outside of the balance fixing holes, the latter therefore being concealed from the flow section by the exterior surface of the cone.

Thus, the fact that the weight-fixing holes are concealed by the inlet cone rather than provided thereon, advantageously means that the exterior surface defining the flow section no longer has the weight housing hollows described above in relation to embodiments of the prior art. Air flow over the inlet cone is therefore optimized, this on the whole leading to a reduction in drag and therefore to an increase in turbomachine performance.

In addition, the fact that the weight-fixing holes provided do not open into the flow section means that there is no longer any need to house a weight in each hole. As a result, it is possible, or even preferable, to culminate in a balancing operation that anticipates fitting weights in just some of the holes provided for this, thus advantageously leading to an appreciable reduction in the weight of the balancing system and of the fan incorporating this system.

In this respect, provision is preferably made that, in operation, at least one of said weight-fixing holes, and more preferably still, a plurality of these same holes, are left clear.

As a preference, said annular balancing flange is fixedly attached to said fan disk, although it could be attached to any other part of the rotary assembly of the fan without departing from the scope of the invention.

It should be noted that said inlet cone extends in the downstream direction as far as said fan blades, in one or more parts. For example, it is possible to produce the inlet cone as an upstream part starting from the vertex of the cone and a downstream part adjacent to the fan blades, the benefit then lying in the possibility of optimizing these parts independently, for example to suit the levels of mechanical/thermal stress that these parts are liable to encounter.

Finally, a further subject of the invention is an aircraft turbomachine comprising a fan as described hereinabove, said turbomachine preferably being a turbojet engine.

Other advantages and features of the invention will become apparent from the nonlimiting detailed description given hereinbelow.

BRIEF DESCRIPTION OF THE DRAWINGS

This description will be given with reference to the attached drawings among which.

DETAILED DESCRIPTION OF THE PREFERRED EMBODIMENTS

Figure 3:
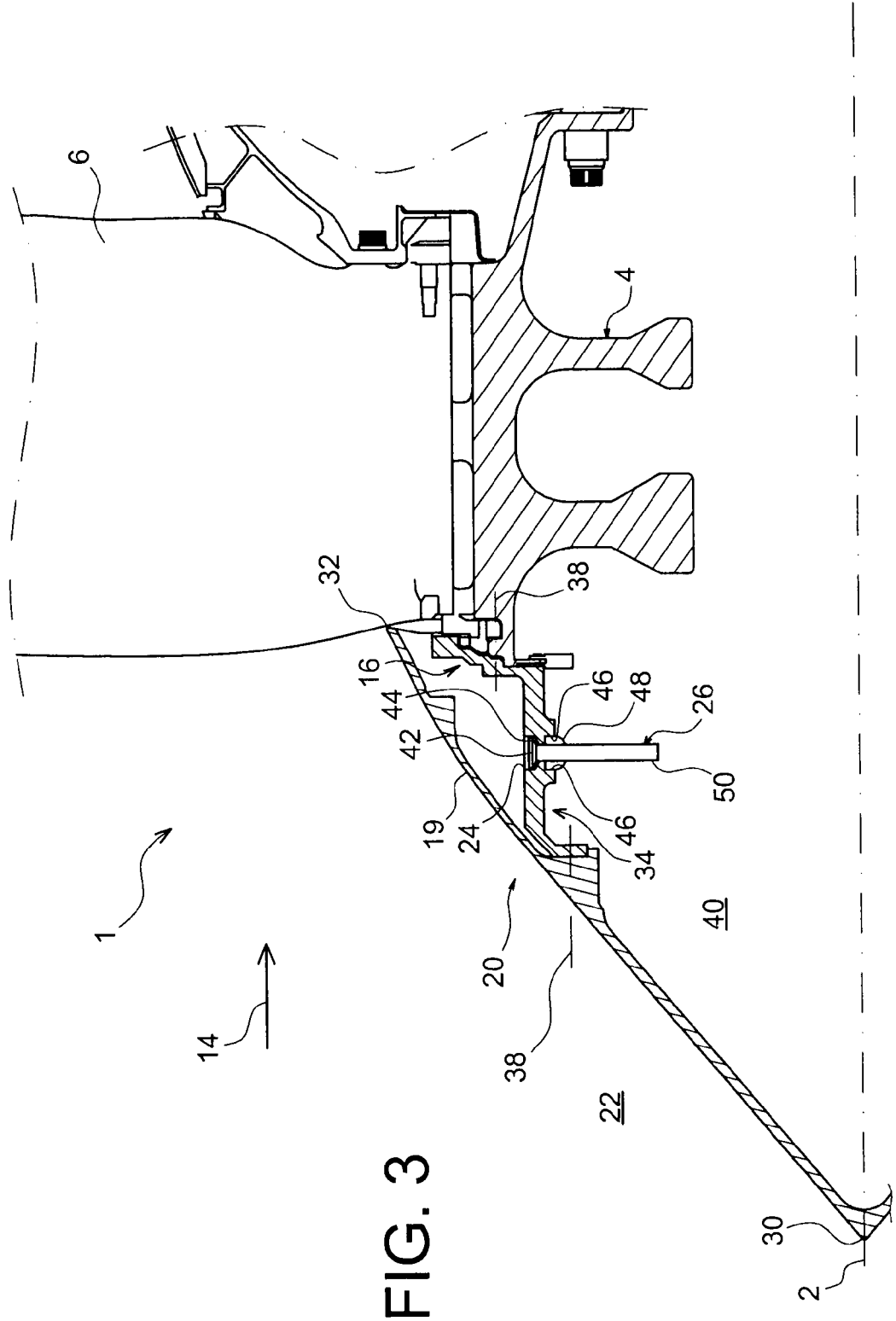
FIG. 3 depicts a view in longitudinal section of part of a fan for a turbojet engine, according to a preferred embodiment of the present invention.
Figure 4:
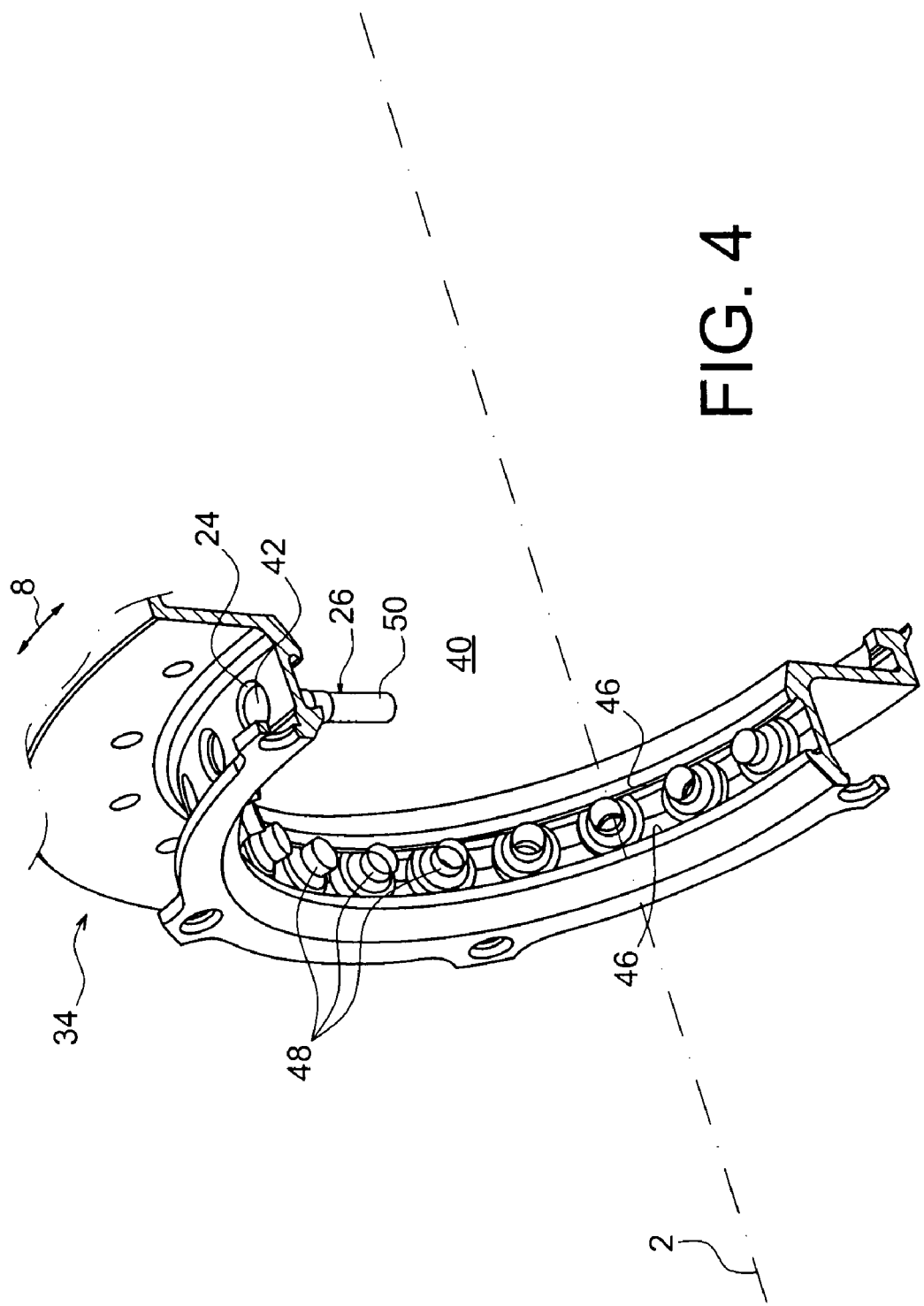
FIG. 4 depicts a perspective partial view of the balancing system with which the fan shown in FIG. 3 is equipped.

Reference is made first of all to FIGS. 3 and 4 which show part of a fan 1 for an aircraft turbojet engine, according to one preferred embodiment of the present invention.

Figure 1:
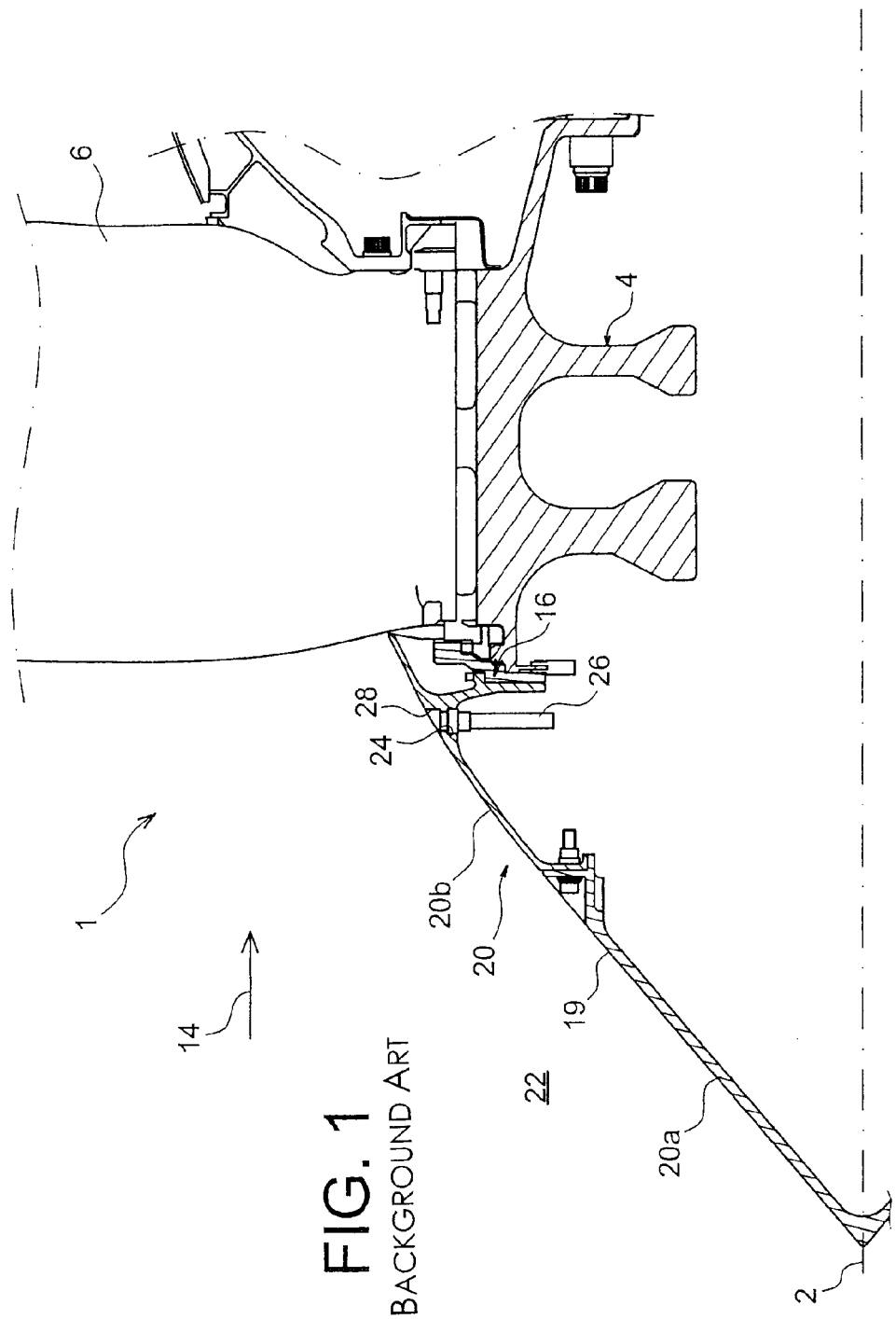
FIG. 1, already described, depicts a view in longitudinal section of part of a fan for a turbojet engine according to a conventional embodiment known from the prior art.
Figure 2:
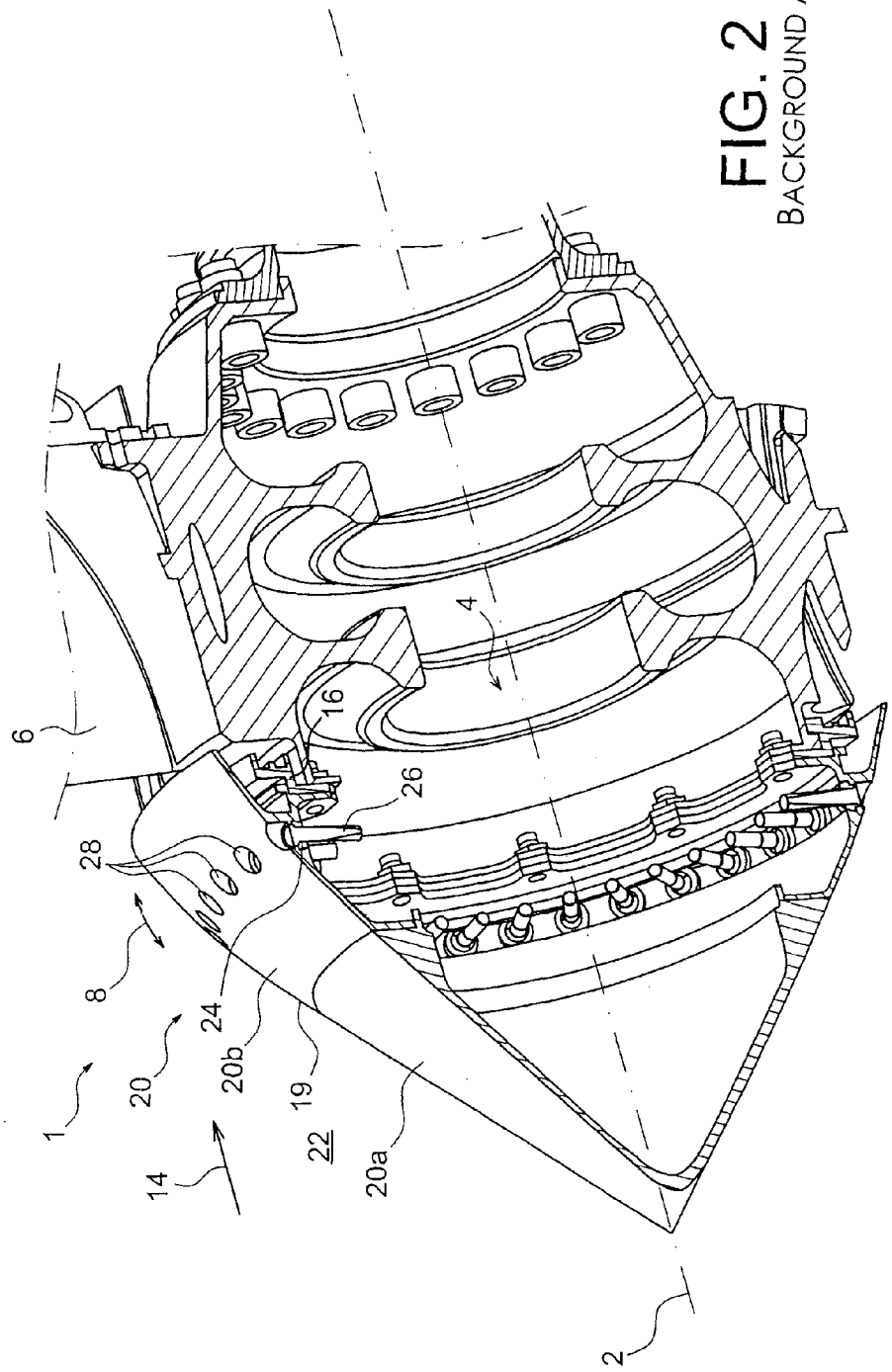
FIG. 2, already described, depicts a partial perspective view of the fan shown in FIG. 1.

This fan has similarities to the fans described with reference to FIGS. 1 and 2 that illustrate the prior art. That being the case, in the figures, elements that may have the same numerical references correspond to elements that are identical or similar.

Thus, it may be seen that the fan 1 according to the preferred embodiment of the invention has a fan disk 4 and fan blades 6 which rotate as one about the longitudinal axis 2.

Upstream of these elements, the inlet cone 20 here is produced as a single part between its vertex 3 and its opposite edge 32 lying flush with the blades 6 as far as which it extends. The exterior surface 19 of this cone, which bounds the flow section 22, therefore itself also runs continuously as far as the fan blades.

One of the particular features of the invention lies in the fact that the balancing system with which the fan is equipped, which is intended for ultimately balancing the turbojet engine, is positioned inside the cone 20, so as to be hidden from the flow section 22.

More specifically, the system has an annular balancing flange 34 situated on the inside of the cone, it being possible for this flange 34, which is positioned radially toward the inside with respect to this cone, to be mounted fixedly by bolts or the equivalent on the disk 4 in its downstream part, and on an interior face of the cone in its upstream part, as illustrated schematically by the dotted lines 38 in FIG. 3.

This special positioning is adopted in such a way that the weight-fixing holes 24 made in the flange 34 are isolated from the flow section 22, that is to say do not open into this flow section, or alternatively are concealed therefrom. Specifically, the weight-fixing holes 24, which are circumferentially spaced apart on the flange, and preferably each directed in a radial direction of the fan, open radially to the inside and to the outside into an interior space 40 of the cone 20 but no longer communicate with the flow section 22 as they did before.

One or more balancing weights 26 are mounted on the flange 34 via the holes, according to the balancing required. One of the advantages of the present invention lies in the possibility, which, incidentally, is preferably adopted, of ultimately balancing the turbojet engine leaving one or several holes 24 clear so as to save weight. In such a case, the fact that the holes that are not housing any weights are unplugged does not give rise to any problems of leakage in the flow section 22 given that these holes remain isolated therefrom, particularly by virtue of the exterior surface 19 which is radially offset outward.

The balancing weights 26 may adopt any form known to those skilled in the art. By way of illustrative example depicted in FIGS. 3 and 4, each weight 26 may adopt the form of a radially directed screw the head 42 of which is directed outward, resting internally against a shoulder 44 provided within its associated hole 24, passing radially through the flange 34. The internal portion of the flange has two opposing circumferential flanks 46 between which nuts 48 are positioned for tightening the screws 26, each of the nuts lying in the internal radial continuation of its associated hole 24. Housing the nuts 48 between the flanks 46 prevents them from turning during tightening of the screws, by virtue of the presence of flats that engage with these same flanks.

Each balancing screw 26 also has a shank 50 extending radially toward the inside from the nut 48, the length of this shank being determined according to the desired weight at the given point for optimized ultimate balancing.

One of the special features of the present invention lies in the fact that the fan blade retaining ring 16 that axially retains these blades 6 with respect to the fan disk 4, is made as a single piece with the annular balancing flange 34. Thus, these two elements 16, 34 can share the same fasteners 38 for fixing them to the rotating fan assembly.

As shown in FIG. 3, provision may be made for the cone 20 also to conceal the fan blade retaining ring 16.

Figure 5:
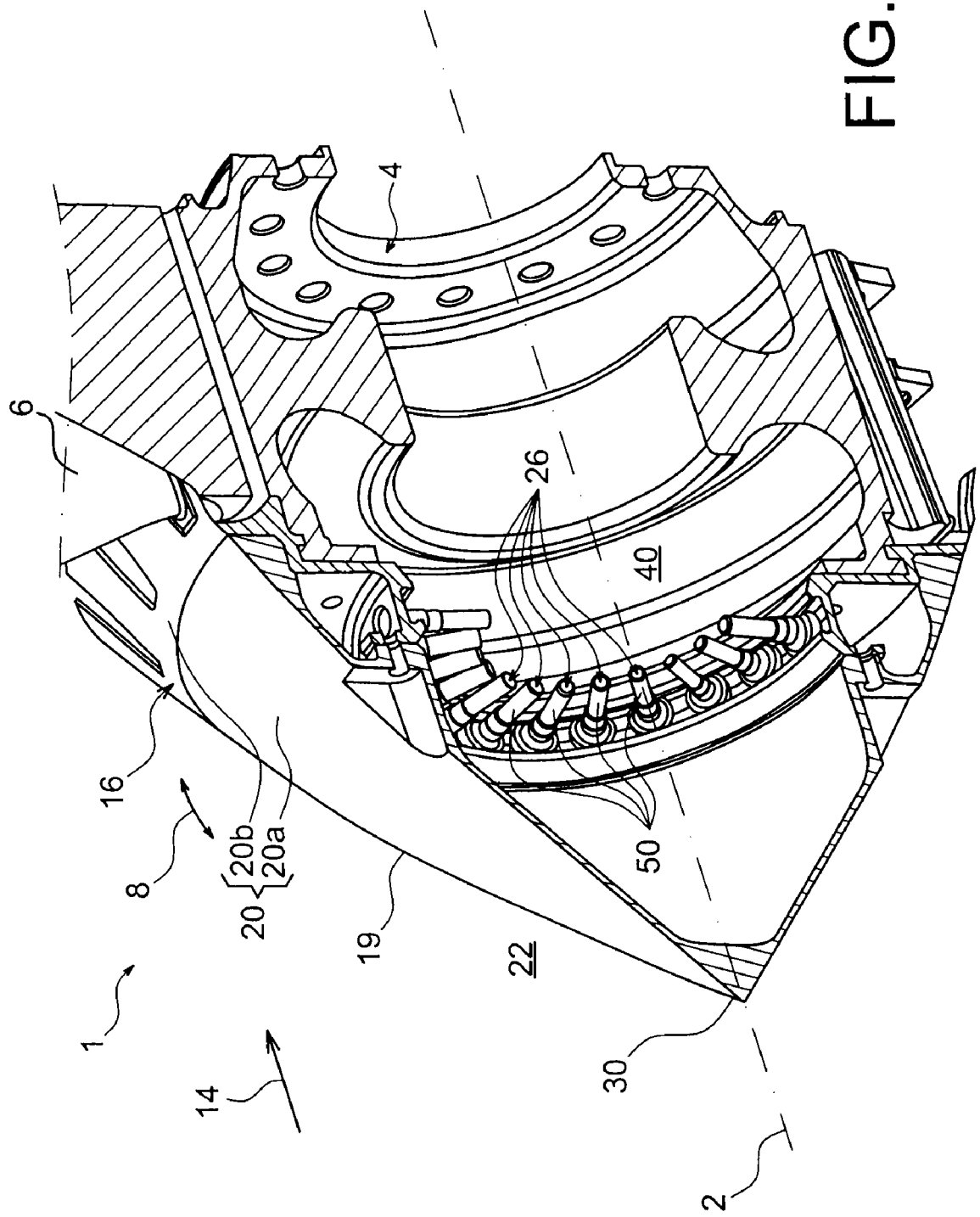
FIG. 5 depicts a perspective view of part of a fan for a turbojet engine, according to another preferred embodiment of the present invention.

However, there is a conceivable alternative solution as shown by the preferred embodiment depicted in FIG. 5. In this figure, it may be seen that the blade retaining ring 16 forms the downstream part 20*b* of the cone 20 which is made in two adjacent parts 20*a*, 20*b* so that it therefore also plays a part in partially defining the exterior surface 19 followed by the flow section 22. Naturally, the ring 16 here is also made as one piece with the flange 34.

Of course, various modifications can be made by those skilled in the art to the invention which has just been described solely by way of nonlimiting examples.

The invention claimed is:

1. An aircraft turbomachine fan comprising:
   a turbomachine inlet cone that has an exterior surface intended to be closely followed by a flow section of the turbomachine;
   a fan disk;
   fan blades which are mounted on said disk with which disk the blades rotate about an axis of rotation of the fan;
   an annular balancing flange that rotates as one with the fan disk about said axis of rotation and is equipped with a plurality of weight-fixing holes spaced circumferentially apart;
   one or more balancing weights mounted fixedly on said annular balancing flange by means of one or several of said weight-fixing holes, said annular balancing flange being positioned inside said inlet cone in such a way that weight-fixing holes of the annular balancing flange are isolated from said flow section of the turbomachine; and
   a fan blade retaining ring for axially retaining the blades with respect to said fan disk, said retaining ring and said annular balancing flange being produced as a single piece.

2. The fan as claimed in claim 1, wherein, in operation, at least one of said weight-fixing holes is left clear.

3. The fan as claimed in claim 1 or claim 2, wherein said annular balancing flange is fixedly attached to said fan disk.

4. The fan as claimed in claim 1 or claim 2, wherein said inlet cone extends in the downstream direction as far as said fan blades.

5. An aircraft turbomachine comprising a fan as claimed in claim 1.

6. The aircraft turbomachine as claimed in claim 5, wherein the turbomachine is a turbojet engine.

7. The fan as claimed in claim 1, wherein the exterior surface of the inlet cone is free of holes.

8. The fan as claimed in claim 1, wherein an upstream end of the annular balancing flange includes a flange which abuts a shoulder provided on an interior surface of the inlet cone and a downstream end of the annular balancing flange includes the fan blade retaining ring.

* * * * *